US012393461B1

(12) United States Patent
Javier et al.

(10) Patent No.: US 12,393,461 B1
(45) Date of Patent: Aug. 19, 2025

(54) CONTEXT-AWARE APPLICATION PROVISIONING

(71) Applicant: Citigroup Inc., New York, NY (US)

(72) Inventors: Patrick Javier, Shinjuku (JP); Brandon Johnson, Bluffdale, UT (US); Christopher Elsey, Irving, CA (US); Shahrad Sassouni, Mill Valley, CA (US); Martin Cabrera, Irvine, CA (US)

(73) Assignee: Citigroup Inc., New York, NY (US)

( * ) Notice: Subject to any disclaimer, the term of this patent is extended or adjusted under 35 U.S.C. 154(b) by 0 days.

(21) Appl. No.: 18/917,643

(22) Filed: Oct. 16, 2024

(51) Int. Cl.
*G06F 9/50* (2006.01)
*G06F 3/04842* (2022.01)
*G06F 8/61* (2018.01)
*G06F 21/31* (2013.01)

(52) U.S. Cl.
CPC ........ *G06F 9/5027* (2013.01); *G06F 3/04842* (2013.01); *G06F 8/61* (2013.01); *G06F 21/31* (2013.01)

(58) Field of Classification Search
None
See application file for complete search history.

(56) References Cited

U.S. PATENT DOCUMENTS

| | | | | |
|---|---|---|---|---|
| 7,685,289 | B2* | 3/2010 | Burckart | H04L 67/14 709/227 |
| 10,498,625 | B1* | 12/2019 | Mozealous | H04L 67/10 |
| 11,651,251 | B2* | 5/2023 | Chu | G06N 20/00 706/12 |
| 11,822,937 | B1* | 11/2023 | Radcliffe | G06F 21/121 |
| 11,948,010 | B2* | 4/2024 | Cropper | G06F 9/5044 |
| 12,141,595 | B1* | 11/2024 | Radcliffe | G06F 8/60 |
| 2003/0018699 | A1* | 1/2003 | Matthews | G06F 8/61 717/124 |
| 2005/0257212 | A1* | 11/2005 | Boyles | G06F 8/61 717/170 |
| 2007/0208837 | A1* | 9/2007 | Tian | G06F 3/1232 709/223 |
| 2011/0271226 | A1* | 11/2011 | Janssen | H04L 67/75 715/802 |

(Continued)

OTHER PUBLICATIONS

Kara et al.; "A New Business Model and Architecture for Context-Aware Applications Provisioning in the Cloud"; 2014 IEEE; (Kara_2014.pdf; pp. 1-5) (Year: 2014).*

(Continued)

*Primary Examiner* — Hiren P Patel
(74) *Attorney, Agent, or Firm* — Davis Wright Tremaine LLP

(57) ABSTRACT

A system or technique can obtain a request to use software based on user interaction with a graphical symbol on a display of a computing device. A parameter of the software can be identified, where the parameter was established by an administrator of the software and is usable to select a predefined computer-implemented host to perform the software. The system can obtain a property of the computing device displaying the graphical symbol. The property is evaluated based, at least in part, on the parameter, and the predefined computer-implemented host is selected to perform the software based, at least in part, on the evaluation.

20 Claims, 6 Drawing Sheets

(56) References Cited

U.S. PATENT DOCUMENTS

| | | | |
|---|---|---|---|
| 2011/0276661 A1* | 11/2011 | Gujarathi | G06F 9/452 |
| | | | 709/219 |
| 2012/0166483 A1* | 6/2012 | Choudhary | G06F 16/2471 |
| | | | 707/E17.014 |
| 2012/0173729 A1* | 7/2012 | Lee | H04L 67/1008 |
| | | | 709/228 |
| 2013/0346994 A1* | 12/2013 | Chen | G06F 9/5044 |
| | | | 718/104 |
| 2015/0067124 A1* | 3/2015 | Hui | H04W 4/50 |
| | | | 709/223 |
| 2016/0210127 A1* | 7/2016 | Subashchandrabose | |
| | | | G06F 8/658 |
| 2017/0026463 A1* | 1/2017 | Lee | G06F 9/5055 |
| 2017/0185438 A1* | 6/2017 | Thomas | G06F 9/45558 |
| 2017/0188213 A1* | 6/2017 | Nirantar | H04L 67/564 |
| 2018/0359338 A1* | 12/2018 | Vyas | H04L 41/0806 |
| 2019/0102157 A1* | 4/2019 | Caldato | H04L 67/10 |
| 2019/0286460 A1* | 9/2019 | Kristiansson | G06F 9/54 |
| 2019/0303207 A1* | 10/2019 | Vadapandeshwara | |
| | | | G06F 9/5038 |
| 2021/0152667 A1* | 5/2021 | Li | H04L 9/50 |
| 2021/0240537 A1* | 8/2021 | Chen | G06F 9/5044 |
| 2024/0202039 A1* | 6/2024 | Peng | H04L 67/02 |

OTHER PUBLICATIONS

La et al.; "A Conceptual Framework for Provisioning Context-aware Mobile Cloud Services"; 2010 IEEE 3rd International Conference on Cloud Computing; (Jung_2010.pdf; pp. 466-443) (Year: 2010).*

Zscaler, Inc., "ZScaler for Banking & Financial Services," White Paper, 2021, 15 pages.

* cited by examiner

CONTEXT-AWARE APPLICATION PROVISIONING

BACKGROUND

Delivering productivity, collaboration, and business-centric applications to a large enterprise involves providing computers to users with varying hardware devices, different types of operating systems and capabilities. Managing the delivery of applications to this extensive fleet of computers demands a significant investment in infrastructure, including virtual hosting servers, compute resources, and storage. This setup encompasses awareness of the operating systems and software necessary for these computers, along with substantial compute power in data centers to both deploy and present these applications across the computers.

BRIEF DESCRIPTION OF THE DRAWINGS

Various techniques will be described with reference to the drawings, in which.

DETAILED DESCRIPTION

Figure 1:
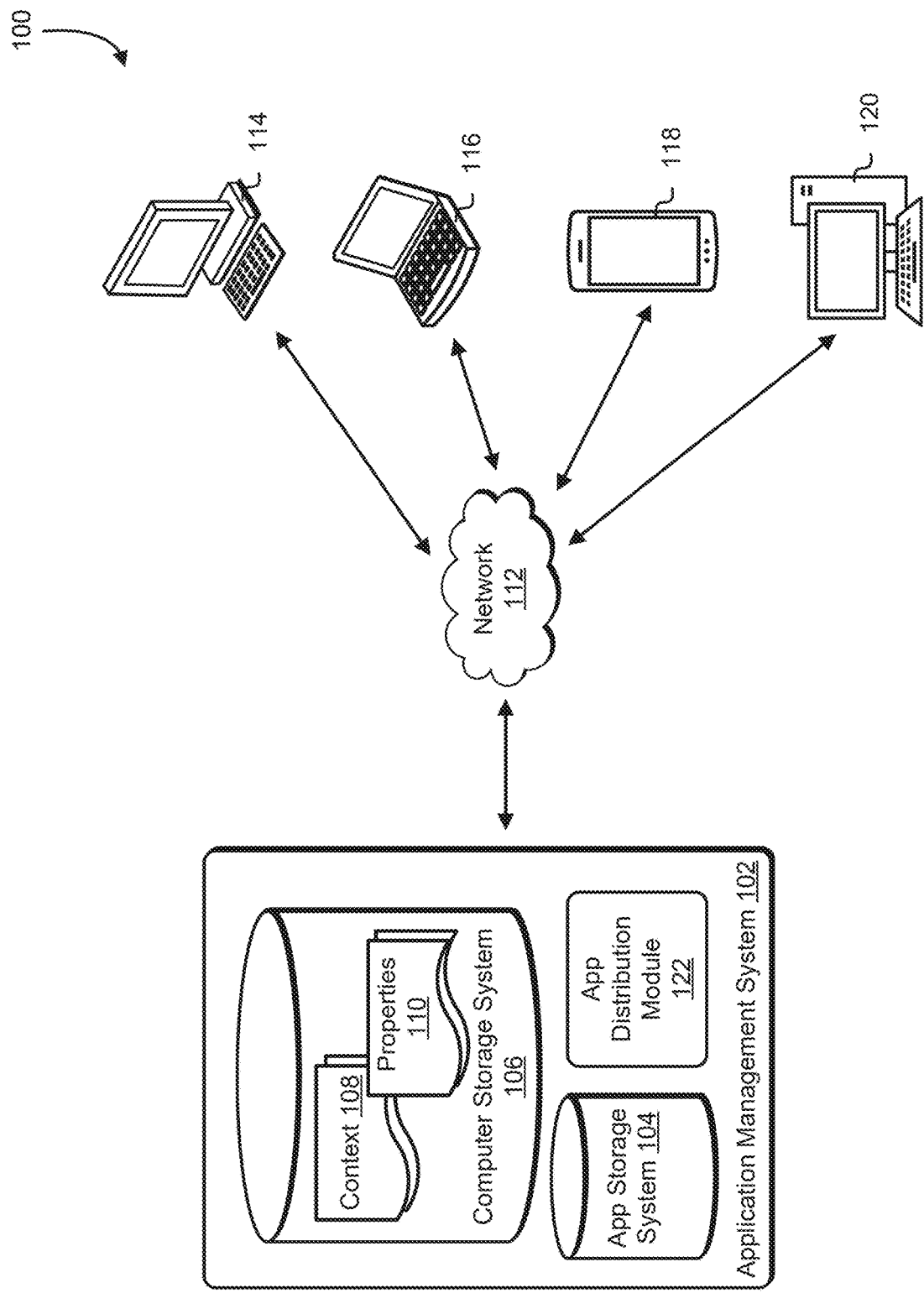
FIG. 1 illustrates an example of a system environment to perform context-aware application provisioning for computing devices, in accordance with an embodiment.

Techniques and systems described herein relate to context-aware application provisioning for computing devices. A digital workspace user interface is provided regardless of the type of computing device or operating system. Icons for applications are presented in the interface and can dynamically apply application, also referred to herein as software, delivery logic depending on the context established for the application and properties of a computing device connected to a computer network. This context-based delivery of applications provides flexible application delivery using a diverse set of computer-implemented hosts, and improves utilization of computing resources, reducing idle times, and enhancing system performance through more efficient delivery of applications to user computing devices. Additionally, techniques described and suggested in the present disclosure improve the field of computing, especially the field of cybersecurity, by enhancing security and control through a streamlined and efficient application delivery process that reduces administrator intervention with computing devices and minimizes the risk of unapproved or inappropriate application use by the computing devices. The application delivery and provisioning process offers a context aware approach that can deliver applications efficiently in multiple ways, choosing an ideal path or option for the user invoking a specific application that is entitled for use.

In some examples, the digital workspace user interface is presented on a display of a computing device when the device connects to backend compute resources. The digital workspace user interface can include any number of application icons authorized for a user of the computing device. Selecting one of the application icons sends a request to the backend compute resources to access the application corresponding to the selected application icon. The request can trigger the backend compute resources to interrogate the computing device to obtain properties of the computing device. The properties can include, in some examples, a network latency associated with the computing device, an operating system (OS) type and version used by the computing device, a connection modality of the computing device, a processing property of the computing device, a geographic location of the computing device, an amount of available computer storage associated with the computing device, an amount of available memory associated with the computing device, and/or network connection information associated with the computing device, and system health information associated with the computing device.

The properties of the computing device can be evaluated, such as by query, against a context established for the application corresponding to the selected application icon. In an example, the context for the application is established by an administrator of the application. The context can include parameters that, coupled with consideration of the properties of the computing device, determine how the application is delivered to the computing device. In an example, evaluation of the context based on the properties of the computing device causes the backend compute resources to deliver an executable installation file to the computing device, which is then executed to install the application corresponding to the selected application icon. In another example, evaluation of the context based on the properties of the computing device causes the backend compute resources to display a web browser window, allowing the user to access the application corresponding to the selected application icon. In an example, the web browser window can be a secure browser window when the computing device to access the application is connected to an unsecured network, such as public wi-fi, an open network, an ad-hoc network, or the like. In another example, the web browser window can be an unsecured browser window when the computing device to access the application is connected to a secure network, such as a VPN, a corporate intranet, private LAN, or the like. In another example, evaluation of the context based on the properties of the computing device and options specific to a particular application causes the backend compute resources to present a containerized application that leverages application virtualization technologies. In an example, a containerized application can be a software application that is packaged along with its dependencies and environment configurations into a standardized application package. This approach enables the application to run consistently across different computing environments, such as production, development, and/or testing.

In an example, the context established for the application corresponding to the selected application icon includes parameters such as a network latency threshold, an OS, a connection modality type, a processing threshold, geographical location information, a computer storage threshold, a memory threshold, network information, system health information, and/or regulatory information.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

For example, various techniques described herein simplify a computing environment by minimizing the need for expensive managed desktops to run applications while making the most efficient use of compute power required to serve users. This is achieved through computer-implemented techniques that emphasize the delivery of applications securely and cost-efficiently to users regardless of the computing devices they use. This application-centric delivery approach provides opportunities for greater flexibility, efficiency, cost reduction in compute infrastructure, and enhanced user experience.

Furthermore, the describe techniques for application delivery address various technical challenges. One significant issue is resource limitations; users often have devices with varying processing power, memory, and storage, which can hinder the performance of resource-intensive applications. Use of the described techniques can allow organizations to leverage greater computational resources, allowing applications to handle larger datasets and complex tasks without straining individual user devices. Additionally, consistency and compatibility become more manageable, as running applications according to the described techniques can provide a uniform environment, reducing issues related to differing operating systems and software versions across user devices. Security risks are also mitigated; server-side execution of applications enables centralized security measures such as firewalls and encryption, protecting sensitive data and minimizing vulnerabilities to malware.

In addition, maintenance and updates are streamlined, as applications can be updated centrally, ensuring all users benefit from the latest features and security patches without needing individual installations based on various use scenarios of the described application delivery techniques. Scalability is another advantage; servers hosing and to provide applications can adapt to increasing user demands by adding resources or employing load balancing, which is more challenging with local applications. Collaboration is enhanced, too, as servers hosing and to provide applications can allow multiple users to access and work on the same data in real-time, breaking down silos and improving teamwork. Also, centralized execution of applications can facilitate systematic data backup and recovery processes, safeguarding critical information against device failures or user errors. Overall, the described techniques for application delivery and execution can provide a more efficient, secure, and collaborative environment for application use.

Techniques described and suggested in the present disclosure improve the field of computing, especially the field of application delivery and provisioning for computing devices, by optimizing the utilization of computing resources, reducing idle times, and enhancing system performance through more efficient application delivery and provisioning processes. Additionally, techniques described and suggested in the present disclosure improve the field of computing, especially the field of cybersecurity, by enhancing security through streamlined application delivery and provisioning processes, reducing manual intervention by administrators, and minimizing the risk of unauthorized or unapproved access to applications.

Any system or apparatus feature as described herein may also be provided as a method feature, and vice versa. System and/or apparatus aspects described functionally (including means plus function features) may be expressed alternatively in terms of their corresponding structure, such as a suitably programmed processor and associated memory. It should also be appreciated that particular combinations of the various features described and defined in any aspects of the present disclosure can be implemented and/or supplied and/or used independently.

Any system or apparatus feature as described herein can include computer programs and computer program products comprising software code adapted, when executed on a data processing apparatus, to perform any of the methods and/or for embodying any of the apparatus and system features described herein, including any or all of the component steps of any method. Any system or apparatus feature as described herein can also include a computer or computing system (including networked or distributed systems) having an operating system that supports a computer program for carrying out any of the methods described herein and/or for embodying any of the apparatus or system features described herein. Any system or apparatus feature as described herein can also include a computer readable media having stored thereon any one or more of the computer programs aforesaid. Any system or apparatus feature as described herein can include a signal carrying any one or more of the computer programs aforesaid.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

FIG. 1 illustrates an example of a system environment 100 to perform context-aware application provisioning for computing devices, in accordance with an embodiment. The system environment 100 can include an application management system 102. In at least one embodiment, the application management system 102 comprises various computer devices and components, which are not depicted here for the sake of clarity. For example, the application management system 102 can comprise an operating system, web server, application server, database management system, middleware, APIs, authentication and authorization services, data storage, caching, logging and monitoring systems, load balancers, security components, backup and recovery systems, configuration management tools, cloud service providers, containerized application servers, SaaS, or AI tools that can enable the system to deliver its outputs. In an embodiment, these components work together to ensure the application management system 102 operates efficiently, securely, and reliably, supporting the applications and services it hosts.

The application management system 102 can include an application storage system 104. The application storage system 104 can be a storage system designed for application distribution and stores application files and related data, enabling the installation of applications on user equipment. Furthermore, the application storage system 104 can facilitate the installation and execution of applications on servers of the application management system 102 to provide connection to applications via a web browser or other graphical user interface (GUI) displayed on an end-user's computing device. The application storage system 104 can facilitate efficient management, deployment, and updating of software across the system environment 100. The application storage system 104 can include various types of storage media, such as hard disk drives (HDDs), solid-state drives (SSDs), or network-attached storage (NAS) devices, to house application files. In addition, or alternatively, the application storage system 104 stores application files and related data on physical storage devices within one or more data centers, such as one or more data centers provided by a cloud storage service provider.

In at least one embodiment, the application management system 102 includes a computer storage system 106. The computer storage system 106 can include various data structures. For example, the computer storage system 106 can include one or more context data structures 108. Additionally, the computer storage system 106 can include one or more computing device properties data structures 110.

The data structures described herein can comprise structured or semi-structured data collections. For example, a data structure can contain data organized in a hierarchical or nested structure using JavaScript object notation (JSON) and/or extensible markup language (XML) formatting. Alternatively, or in addition, a data structure can include data in arrays, objects, nested structures, and the like. In at least one embodiment, data included in the described one or more data structures is efficiently stored so that systems of the application management system 102 can perform operations such as retrieval, insertion, deletion, and sorting of the data.

The context 108 can include data, including a set of rules used to determine how an application is delivered to an end user's computing device. For example, the set of rules can be used to determine that the application may not be installed on an end user's computing device, or the set of rules can be used to determine that the application may be installed on an end user's computing device. In another example, the set of rules can be used to determine that the application is to be provided to an end user through a web browser displayed on the end user's computing device. In another example, the set of rules can be used to determine that the application is to be provided using an application container. For example, the application container can be delivered, via a cloud service or server, to the end user's computing device. A container runtime is used by the computing device to execute the application container to cause generation of an environment in which the application is performed.

In at least one embodiment, the set of rules defined in the context 108 enable dynamic application delivery for the end user's computing device. For instance, when the device transitions from a secure network to an unsecured one-such as moving from a corporate network to an offsite network—the dynamic application of these rules can prompt the system to switch application execution from the user's device to a secure web browser. In another example, when the device is moved to a geographic area governed by one or more specific regulations, the dynamic application of the set of rules can cause the system to switch application execution from the user's device to a secure web browser or vice versa. Regular or continuous monitoring of the end user's computing device, along with the rules defined in the context 108, enables systems hosting applications to dynamically deliver one or more applications to the user's device.

In at least one embodiment, the context 108 includes one or more parameters used to determine how or if an application is delivered to an end user's computing device. The one or more parameters can include a network latency threshold, an OS, a connection modality type, a processing threshold, geographical location information, a computer storage threshold, a memory threshold, network information, computing device health information, and/or regulatory information. The context 108, therefore, can present or deliver an application in different ways to the same user or device in the system environment 100, and the delivery can be dynamic based on user behavior. This enables the application management system 102 to offer the optimal and most efficient option for the user to access the application.

The network latency threshold parameter can be a predefined limit or benchmark that defines the acceptable level of delay in network communication. Latency refers to the time it takes for data to travel from a source computing system to the destination computing system across a network. This delay can be caused by various factors, including network congestion, routing inefficiencies, and the physical distance between nodes.

The OS parameter can refer to a specific release or iteration of an OS. Each version of an OS typically includes a set of features, updates, and improvements over previous versions. Understanding the OS can be important for determining application compatibility, security, and functionality. In at least one embodiment, the OS parameter can identify the OS type, such as Microsoft Windows, macOS, Linux, Android, or iOS.

The connection modality type parameter can refer to the method or type of connection used to establish communication between computing devices and backend computing systems. It specifies how data is transmitted and what kind of network or communication technology is utilized. The term can be used in various contexts, including networking, telecommunications, and application delivery. A connection modality type might refer to a virtual private network (VPN) connection, the security features of a connection, such as whether it uses encryption, and/or the type of computing device, such as a corporate-issued computing device or a user's personal computer. The connection modality type could also refer to the network connection type, such as wired connections (e.g., Ethernet) or wireless connections (e.g., Wi-Fi, Bluetooth, cellular).

The processing threshold parameter can refer to a predefined limit or benchmark related to the computational capacity or performance requirement of an end user's computing device. It is used to determine when a computing device, to perform or execute an application, reaches a point where its performance might be compromised.

The geographical location information parameter in the context of computing devices and application execution refers to the data that identifies the physical location of a device or user, which can influence whether an application is authorized to run or how it is delivered. This information can be important for various reasons, including compliance with regulations, content delivery optimization, and ensuring security.

The computer storage threshold parameter refers to a predefined amount of storage space that is needed on a computing device to install and perform an application on the computing device. This threshold can be important for managing the storage resources of computing devices and can impact the ability to execute applications. The memory threshold parameter in the context of computing devices refers to a predefined limit or benchmark related to the amount of memory (RAM) that should be available for an application. This threshold can be important for managing system performance and ensuring that applications can execute properly.

The network information parameter in the context of computing devices and application execution refers to data and details related to the network environment in which a computing device operates. This information can be important for determining how applications connect, communicate, and perform over a network. In an example, the network information parameter is an IP address. In another example, the network information parameter is a network name. In yet another example, the network information parameter is network gateway information, such as a firewall's or load balancer's IP address. The network information can also determine if the device is connecting on premises or using a public Wi-Fi or using a secure virtual private network.

The computing device health information parameter can include a variety of metrics and data points that help assess the performance and condition of a computing device. For example, the metrics and data points can include system performance metrics, such as CPU usage and load averages, memory usage and availability, disk space usage and read/write speeds, and/or network bandwidth and latency. In at least one embodiment, the metrics and data points can include hardware status, such as temperature readings of CPU, GPU, and other components, fan speeds and status, power supply status, and/or battery health. In some examples, the metrics and data points can include software and application performance information, such as application response times and crash reports, OS performance metrics (boot time, system uptime), and/or updates and patch statuses for software and OS. In at least one embodiment, the metrics and data points can relate to security data (e.g., antivirus and malware scan results, firewall status), event logs (e.g., system logs, applications logs for errors and warnings, hardware failure logs), and/or user activity (e.g., user login times, application usage patterns). In at least one embodiment, the application management system 102 can leverage the computing device health information and send instructions, to a computing device to at least display an application, where the instructions cause the computing device to at least modify one or more operation and/or hardware configurations of the computing device. Such modifications can include flushing memory and/or storage, increasing processing capability, causing the computing device to install or reinstall some or all of a requested application, and the like. In at least one embodiment, the computing device can be a virtual machine to access one or more requested applications.

The regulatory information parameter can provide rules, standards, and legal requirements that govern how software and applications can be used, accessed, or distributed. This information can impact the ability to execute an application in various ways, depending on the geographic region, industry, and specific regulatory requirements. In at least one embodiment, the regulatory information parameter can refer to data protection and privacy laws, industry standards, licensing and intellectual property requirements, export controls and trade restrictions, and the like.

The properties 110 can include data about a computing device that is used to access an application, such as executing the application and/or accessing it via a GUI (e.g., web browser interface). In at least one embodiment, the application management system 102 obtains the properties 110 by interrogating the computing device to gain access to the application. The properties 110 can be stored in the device's registry. In another example, as illustrated, the properties 110 are stored in the computer storage system 106.

The data of the properties 110 can include network latency associated with the computing device, an OS used by the computing device, a connection modality of the computing device, a processing threshold of the computing device, a geographic location of the computing device, an amount of available storage associated with the computing device, an amount of available memory associated with the computing device, and/or network information associated with the computing device. Each of these properties is described above and is not repeated here for the sake of brevity.

Various computing devices can communicate with the application management system 102 to request use of one or more applications hosted by the application storage system 104. In at least one embodiment, the computing devices can communicate with the application management system 102 over a network 112. The network 112 can include one or more local area networks, wide area networks, metropolitan area networks, personal area networks, virtual private networks, storage area networks, campus area networks, private cloud network, and/or global area networks.

The various computing devices in the system environment 100 can include a corporate thin client or desktop computing device 114, a user's personal computer 116 or other bring-your-own-device (BYOD), a mobile device 118 (which can be either a corporate-issued mobile device or a user's personal mobile device), and/or another computing device type 120. Each of the computing devices 114-120 can request access to one or more applications hosted by the application storage system 104.

In at least one embodiment, requesting access to an application is facilitated through a GUI portal that displays one or more graphical symbols for an application, such as one or more icons. Displaying a GUI portal on a display of one or more of the computing devices 114-120 involves a series of steps where the request is sent to the application management system 102, which processes and responds with the necessary data. The request can be processed by an application distribution module 122 of the system 102. The requesting computing device then renders this data using a graphics rendering engine to display the GUI portal on an associated display. The process ensures that a user sees an interactive and visually organized interface for the GUI portal. In at least one embodiment, the GUI portal is web-based, where a web browser sends the request to the application management system 102 and receiving the necessary data causes the web browser to display the GUI portal. In at least one embodiment, the GUI portal is an application that receives the data and processes it to construct the GUI portal on a display of the requesting computing device. The process of displaying the GUI portal can include rendering and displaying the one or more graphical symbols for one or more applications.

In at least one embodiment, the application distribution module 122 provides data that populates the GUI portal with icons to access applications based on application permissions associated with the user of one or more of the computing devices 114-120. For example, a request for the GUI portal can include a user's credential information that is leveraged by the application distribution module 122 to determine which application icons to display in the GUI portal.

An icon on the GUI portal can be selected by a user to gain access to an associated application. In this example, when the icon is selected, a request to access the associated application is sent to the application management system 102 and processed by the application distribution module 122. The request can include data associated with the user's computing device 114, 116, 118, or 120. For example, the request can include one or more of the described properties of the computing device 114, 116, 118, or 120 that sent the request to the application management system 102. In another example, the request can include an identifier of the computing device 114, 116, 118, or 120 that sent the request to the application management system 102. The application distribution module 122 can use the identifier to locate a properties data structure 110 that includes pre-stored one or more properties of the computing device 114, 116, 118, or 120 that sent the request to access the application.

The processing performed by the application distribution module 122 based on a received request to access an application can include locating the context 108 for the application, such as by performing a query operation. The application distribution module 122 evaluates the one or more parameters of the context 108 for the application based on the one or more properties of the computing device 114, 116, 118, or 120 that sent the request to access the application. In at least one embodiment, the evaluation performed by the application distribution module 122 causes the module 122 to select a predefined computer-implemented host to perform and/or execute the requested application. For example, the evaluation can cause the application distribution module 122 to retrieve and install files and associated data of the application from the application storage system 104. The application distribution module 122 can send the install files and associated data of the application to the requesting computing device 114, 116, 118, or 120. The requesting computing device 114, 116, 118, or 120 can execute the install files for the requested application in response to the selection of the associated icon on the GUI portal. Alternatively, for example, the evaluation can cause the application distribution module 122 to execute the requested application using compute resources of the application management system 102 and deliver a GUI of the application to the requesting computing device 114, 116, 118, or 120 via a web browser or other GUI rendered on a display of the requesting computing device 114, 116, 118, or 120. Alternatively, for example, the evaluation can cause the application distribution module 122 to send a message to the requesting computing device 114, 116, 118, or 120 specifying that the requested application is not authorized.

Figure 2:
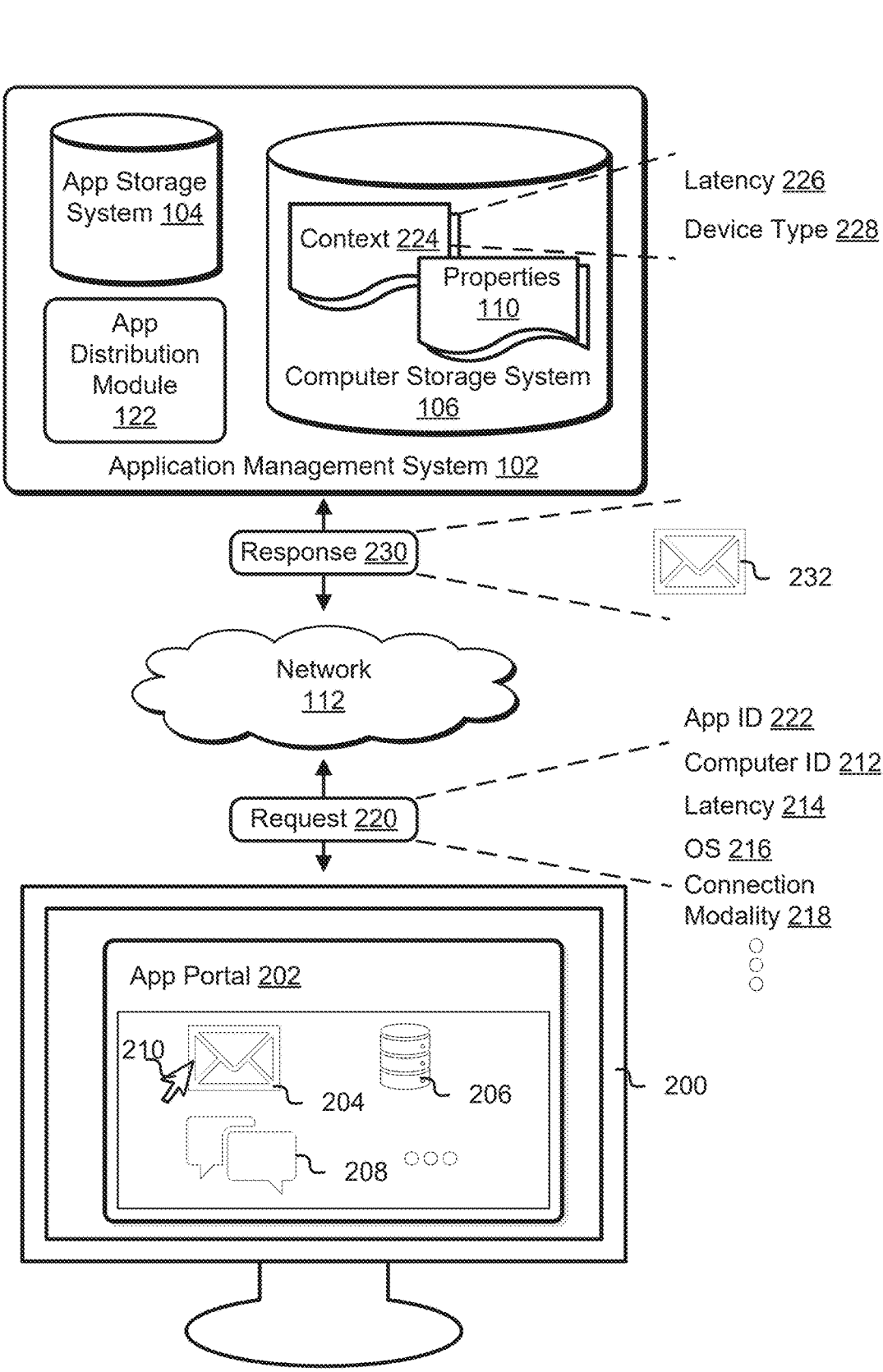
FIG. 2 illustrates additional details of the system environment to perform context-aware application provisioning for computing devices, in accordance with an embodiment.

FIG. 2 illustrates additional details of the system environment 100 to perform context-aware application provisioning for computing devices, in accordance with an embodiment. A display 200, which may be associated with any computing device, such as one of the computing devices 114-120, provides an application portal 202. The application portal 202 can be a GUI. The application portal 202 can be populated with one or more icons. In at least one embodiment, the application portal 202 includes an icon 204 to access an email application, an icon 206 to access the database application, and an icon 208 to access an instant messaging application. The icons 204-208 can be pre-populated in the application portal 202 based on, for example, permissions and/or credential information associated with a user of the computing device linked to the display 200. Any number of application icons can be populated in the application portal 202 by the application management system 102. For clarity, the description will describe the display 200 as being associated with the computing device 114.

In at least one embodiment, the application portal 202 can be populated with one or more icons based on an application repository that identifies many applications that can be delivered to end user computer devices, in accordance with the described embodiments. In at least one embodiment, the application repository can deploy intelligence to consider the permissions and/or credential information associated with a user of the computing device when determining which one or more icons are displayed in the application portal 202. For example, the intelligence of the application repository can use the permissions and/or credential information to access controls that dictate the user's access levels to various applications and data. Thus, in at least one embodiment, the application repository can ensure that only authorized users can access specific applications, maintaining security and protecting sensitive data from unauthorized access.

In at least one embodiment, a user of the computing device 114 can select the icon 204 using a cursor 210. Selection of the icon 204, to access the email application, causes the computing device 114 to collect one or more properties associated with the computing device 114. For example, the computing device 114 can gather properties including a computer identification 212 of the computing device 114, a network latency 214, an OS 216 of the computing device 114, and a connection modality 218 associated with the computing device 114. The computer identification 212 can comprise one or more of a serial number, a MAC address, a universally unique identifier (UUID), or any other identification information for the computing device 114 that is recognizable by the application management system 102. The network latency 214 can be a time value, such as in milliseconds or microseconds, which refers to how long it takes data to travel between the computing device 114 and the application management system 102. The time value for the network latency 214 can be a round-trip time (RTT) or a one-way latency time. The OS 216 can be the name of the OS used by the computing device 114, a version number of the OS, a build number of the OS, a combination of these information, or any other suitable information that can be used by the application management system 102 to identify the OS. The connection modality 218 can refer to a VPN connection, the security features of the connection, such as whether it uses encryption, and/or the type of computing device, such as a corporate-issued computing device or a BYOD. The connection modality type could also refer to the network connection type, such as wired connections (e.g., Ethernet) or wireless connections (e.g., Wi-Fi, Bluetooth, cellular).

In at least one embodiment, when the user of the computing device 114 selects the icon 204 using the cursor 210, the computing device 114 generates a request 220. The request 220 can include one or more properties associated with the computing device 114. For example, the request 220 can include the computer ID 212, the latency 214, the OS 216, and the connection modality 218. The request 220 can also be generated to include an identifier 222 for the application selected by the user of the computing device 114. The identifier 222 can comprise metadata, which includes, for example, a name of the selected application, a unique identifier for the application, such as a globally unique identifier (GUID), and/or a name for one or more executable file names associated with the application.

The request 220 can be communicated to the application management system 102 over the network 112. The request 220 can trigger the application management system 102 to determine how to deliver the email application associated with icon 204 to the computing device 114. In at least one embodiment, the application management system 102 examines the request 220 to identify the one or more properties associated therewith. The application management system 102 can use the application identifier 222 included in the request 220 to locate a context 224 for the email application associated with icon 204.

The context 224 can include one or more parameters established by an administrator of the application management system 102. The one or more parameters can be used to determine when an application can be installed on computing devices, when the application can be presented, such as via a web interface, when to be presented as a containerized application, on computing devices, and when the application is not permitted for installation or presentation on computing devices. In at least one embodiment, the context 224 includes a latency threshold 226 and a connection modality 228 (i.e., device type). The latency threshold 226 can be expressed as a time value in milliseconds or microseconds. The device type 228 can specify corporate device, enterprise device, managed device, or any other similar indicator.

In at least one embodiment, the application distribution module 122 evaluates the one or more properties of the request 220 based on the one or more parameters of the context 224. For example, the application distribution module 122 compares the latency 214 against the latency threshold 226. Furthermore, using the computer ID 212, the application distribution module 122 determines that the computing device 114 is a corporate device, and the application distribution module 122 compares this information against the device type 228 of the context 224. Based on the foregoing, the application distribution module 122 determines that the properties included with the request 220 satisfy the parameters of the context 224. This determination triggers the application distribution module 122 to generate a response 230. The response 230, based on determining that the properties included with the request 220 satisfy the parameters of the context 224, can include application files and related data 232. The application files and related data 232 can be obtained from the application storage system 104 and can be used to install the email application associated with the icon 204.

The response 230 can be received by the computing device 114. The computing device 114 uses the application files and related data 232 of the response to install the email application associated with the icon 204 on the storage of the computing device 114. This process allows the user of the computing device 114 to access the email application associated with the icon 204.

In at least one embodiment, the application distribution module 122 can periodically or constantly evaluate the performance of one or more applications delivered to the computing device 114. For example, the application distribution module 122 can monitor health information from backend systems and/or the system of the computing device 114 to determine if application performance is compromised or may become degraded based on health information indicating that system operation is suboptimal. In at least one embodiment, the application distribution module 122 can proactively modify how an application is delivered to the computing device 114 based on the health information from backend systems and/or the health information of the application. For example, if a server hosting an application is overloaded, the application distribution module 122 can dynamically modify how the application is delivered to the computing device 114 by switching to another server that is not overloaded. In another example, the application distribution module 122 can determine if a containerized application is undergoing an update or is to be updated and thus deliver the application to the computing device 114 via a web browser until the application update process for the application is complete.

Figure 3:
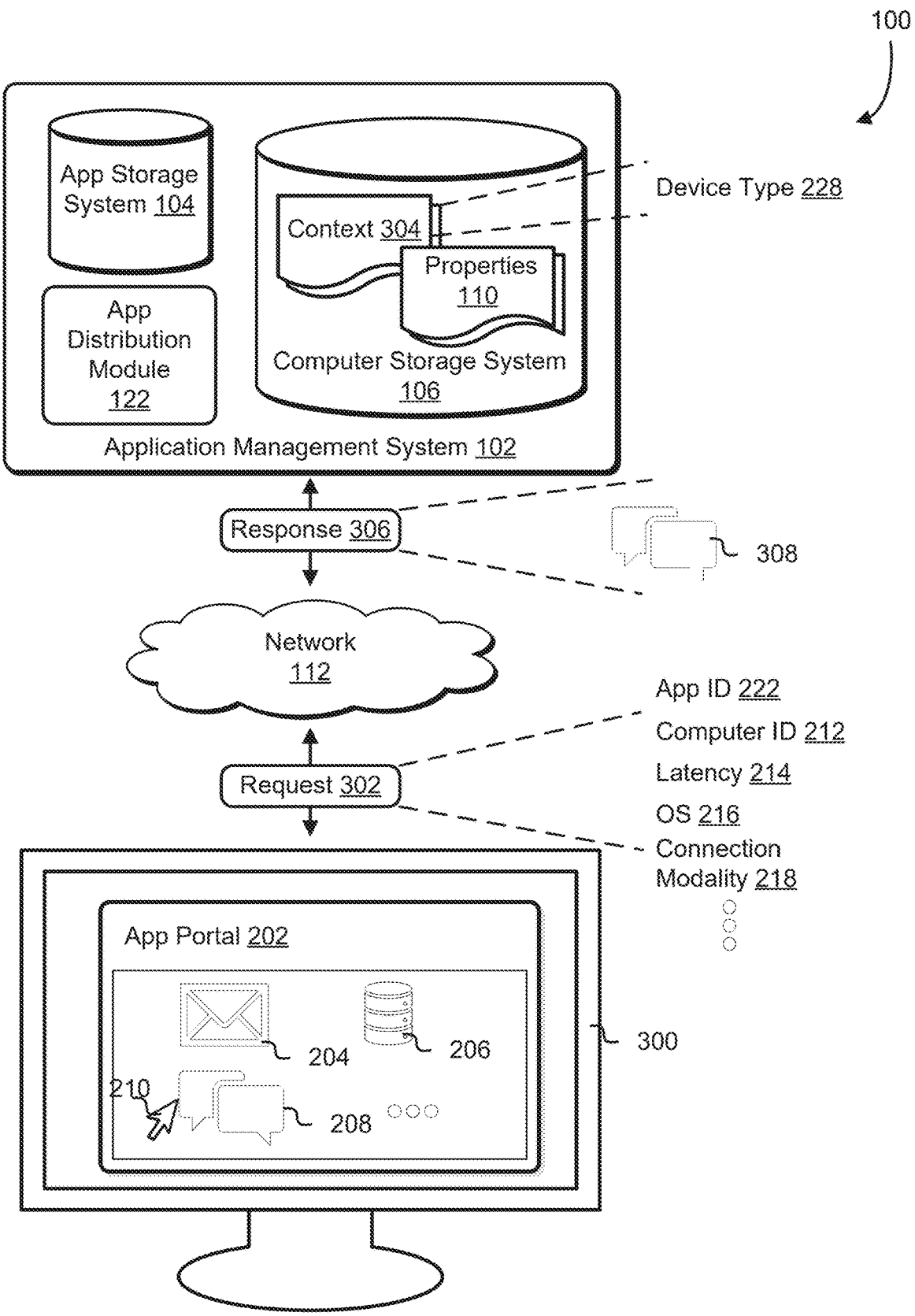
FIG. 3 illustrates additional details of the system environment to perform context-aware application provisioning for computing devices, in accordance with an embodiment.

FIG. 3 illustrates additional details of the system environment 100 to perform context-aware application provisioning for computing devices, in accordance with an embodiment. A display 300, which may be associated with any computing device, such as one of the computing devices 114-120, provides the application portal 202. In at least one embodiment, the application portal 202 includes the icon 204 to access the email application, the icon 206 to access the database application, and the icon 208 to access the instant messaging application. For clarity, the description will describe the display 300 as being associated with the computing device 120.

In at least one embodiment, a user of the computing device 120 can select the icon 208 using a cursor 210. Selection of the icon 208, to access the instant messaging application, causes the computing device 120 to collect one or more properties associated with the computing device 120. For example, the computing device 120 can gather properties including a computer identification 212 of the computing device 120, a network latency 214, an OS 216 of the computing device 120, and a connection modality 218 associated with the computing device 120. The computer identification 212 can comprise one or more of a serial number, a MAC address, a UUID, or any other identification information for the computing device 120 that is recognizable by the application management system 102. The network latency 214 can be a time value, such as in milliseconds or microseconds, which refers to how long it takes data to travel between the computing device 120 and the application management system 102. The time value for the network latency 214 can be RTT or a one-way latency time. The OS 216 can be the name of the OS used by the computing device 120, a version number of the OS, a build number of the OS, a combination of these information, or any other suitable information that can be used by the application management system 102 to identify the OS. The connection modality 218 can refer to a VPN connection, the security features of the connection, such as whether it uses encryption, and/or the type of computing device, such as a corporate-issued computing device or a BYOD. The connection modality type could also refer to the network connection type, such as wired connections (e.g., Ethernet) or wireless connections (e.g., Wi-Fi, Bluetooth, cellular).

In at least one embodiment, when the user of the computing device 120 selects the icon 208 using the cursor 210, the computing device 120 generates a request 302. The request 302 can include one or more properties associated with the computing device 120. For example, the request 302 can include the computer ID 212, the latency 214, the OS 216, and the connection modality 218. The request 302 can also be generated to include an identifier 222 for the application selected by the user of the computing device 120. The identifier 222 can comprise metadata, which includes, for example, a name of the selected application, a unique identifier for the application, such as a GUID, and/or a name for one or more executable file names associated with the application.

The request 302 can be communicated to the application management system 102 over the network 112. The request 302 can trigger the application management system 102 to determine how to deliver the instant messaging application associated with icon 208 to the computing device 120. In at least one embodiment, the application management system 102 examines the request 302 to identify the one or more properties associated therewith. The application management system 102 can use the application identifier 222 included in the request 302 to locate a context 304 for the instant messaging application associated with icon 208.

The context 304 can include one or more parameters established by an administrator of the application management system 102. The one or more parameters can be used to determine when an application can be installed on computing devices, when the application can be presented, such as via a web interface, as a containerized application, or on computing devices, and when the application is not permitted for installation or presentation on computing devices. In at least one embodiment, the context 304 includes a connection modality 228 (i.e., device type). The device type 228 can specify corporate device, enterprise device, managed device, or any other similar indicator.

In at least one embodiment, the application distribution module 122 evaluates the one or more properties of the request 302 based on the one or more parameters of the context 304. Identifying the context 304 can be performed by a query using one or more properties of the request 302. For example, using the computer ID 212, the application distribution module 122 determines that the computing device 120 is a BYOD device, and the application distribution module 122 compares this information against the device type 228 of the context 304. In this case, the device type 228 specifies a corporate device. Based on the foregoing, the application distribution module 122 determines that the properties included with the request 302 do not satisfy the parameters of the context 304. Identifying the parameters of the context 304 can be performed by a query using one or more properties of the request 302. This determination triggers the application distribution module 122 to generate a response 306. The response 306, which is based on determining that the properties included with the request 302 do not satisfy the parameters of the context 304, can include application-related data 308. The application-related data 308 can be obtained from the application storage system 104 and can be used to display/render the application associated with the icon 208, but not actually install the application on the computing device 120. Alternatively, in at least one embodiment, the response 306 is generated to include a message that the properties of the request 302 do not permit installation or display of the application associated with the icon 208. In this example, the response 306 is generated based on the determination that the properties included with the request 302 do not satisfy the parameters of the context 304. Identifying the parameters of the context 304 can be performed by a query using one or more properties of the request 302.

In at least one embodiment, when a computing device is informed that it may not install, display, or otherwise use a requested application, information from the application management system 102 can trigger self-healing or system optimization tasks or suggestions to adjust one or more properties of the computing device. These adjustments to the one or more properties of the computing device can then enable the device to install the requested application or interface with the requested application through a GUI. The self-healing or system optimization tasks can be facilitated through one or more scripts provided by the application management system 102, and can be triggered based on system health information and/or parameters. The one or more scripts can then be performed by the computing device to liberate memory, update drivers and/or the OS, restart a local service of the computing device, liberate disk space, restart the computing device, adjust active processes of the computing device to increase processing speed, suggest a change in geographical location, and/or connect the computing device to a different connection modality to improve latency, enhance the security of the connection modality, and/or provide instructions to request access to the application using a different device type (e.g., corporate device rather than BYOD), or when the computing device is a virtual device, additional memory and/or processing power can be dynamically allocated.

In at least one embodiment, the described context-aware provisioning of one or more applications is augmented using historical information pertaining to the use of the one or more applications. The historical information can include data identifying that a user is authorized to use the one or more applications. The historical information can include data identifying that the user's computing device supports local installation of the one or more applications or that the user's computing device requires web browser access (e.g., secured or unsecured) to the one or more applications. In addition, or alternatively, the historical information can include data indicating changes that should be made to the computing device, such as increasing memory or processing power, before the computing device is permitted access the application. This historical information can be used by the application management system 102 to accelerate and/or streamline application delivery by reducing the interrogating process performed on the computing device in advance of allocating a requested application.

Figure 4:
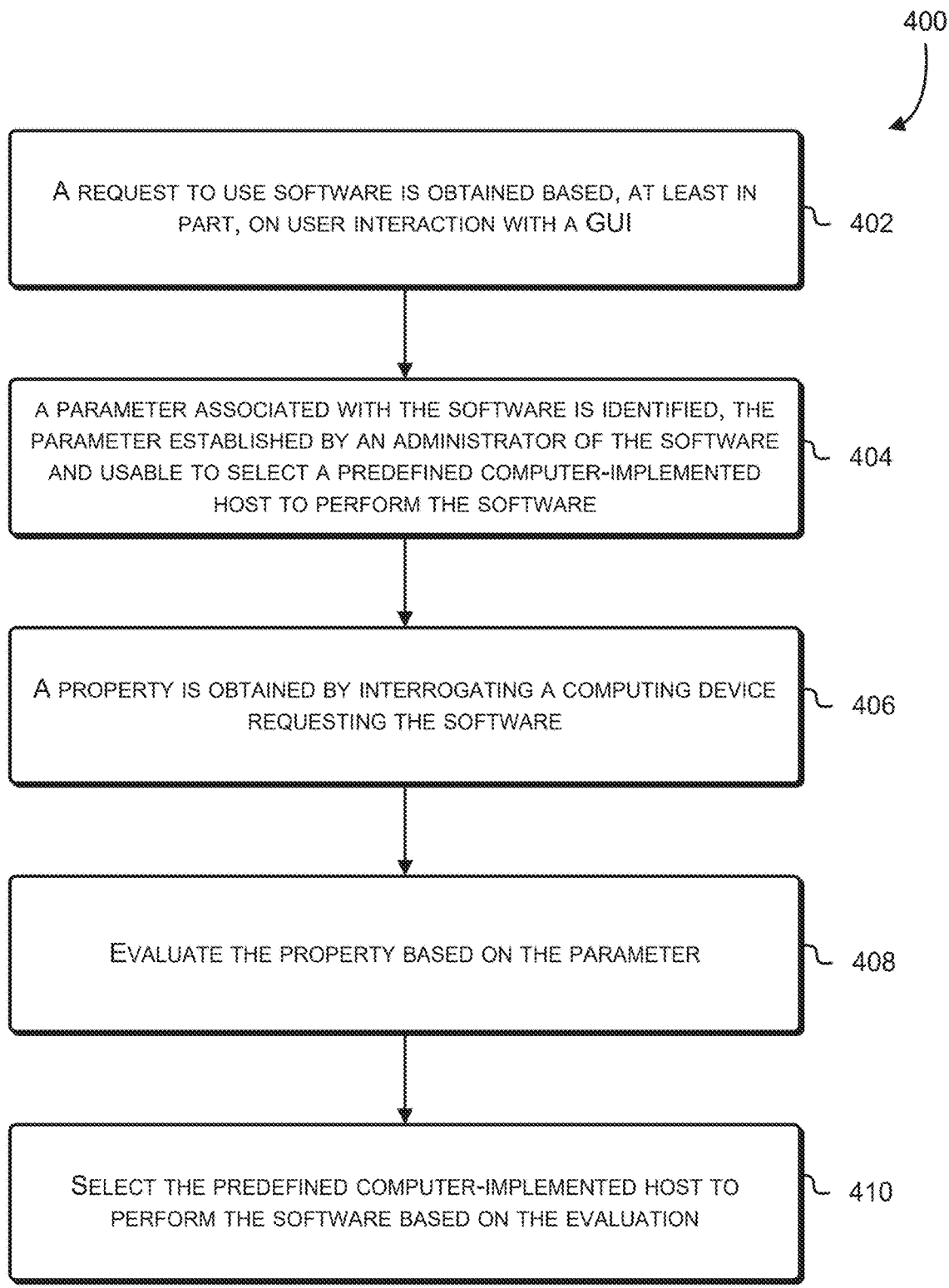
FIG. 4 is a flowchart illustrating an example of a process for performing context-aware application provisioning for computing devices, in accordance with various embodiments.

FIG. 4 is a flowchart illustrating an example of a process 400 for performing context-aware application provisioning for computing devices, in accordance with various embodiments. Some or all of the process 400 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system, such as the computing devices and/or systems of FIGS. 1-3 and FIG. 6. The process 400 includes a series of operations, identified by respective blocks in the following, to perform context-aware application provisioning for computing devices, in accordance with various embodiments.

At block 402, a request to use software (e.g., an application) is obtained. In at least one embodiment, the request to use software is obtained based on user interaction with a GUI. For example, the request to use software is obtained based on user interaction with a graphical symbol, such as an icon for the software. The request may be received based on user interaction with a computing device to use the software. The request can be received at the backend systems of an entity, such as a corporation, which provides access to software. In at least one embodiment, the request is received by the application management system 102, and the request is generated by at least one of the computing devices 114-120. The request can include one or more properties of a computing device that is to use the software. In at least one embodiment, the request can include request 220 and/or 302.

At block 404, a parameter associated with the software is identified. The parameter can be established by an administrator of the software and is usable to select a predefined computer-implemented host to perform the software. In at least one embodiment, the parameter comprises a plurality of parameters. The parameter can be included in a data structure, such as a context data structure. Parameters, coupled with consideration of properties of a computing device, can determine how software is delivered to the computing device, which can be included in a plurality of predefined computer-implemented hosts considered by a system to provide access to the software. In an example, evaluation of the context based on the properties of the computing device causes a system to deliver an executable installation file to the computing device (e.g., a computer-implemented host), which is then executed to install the software. In another example, evaluation of the context based on the properties of the computing device causes the system (e.g., a computer-implemented host) to deliver data that enables the computing device to display a web browser window, allowing the user to access the software. In at least one embodiment, the parameter is included in the context 108, 224, and/or 304. In at least one embodiment, the system comprises the application management system 102.

At block 406, a property of the computing device associated with the GUI is obtained. The property of the computing device associated with the GUI can be obtained by interrogating the computing device. In at least one embodiment, the property of the computing device associated with the GUI is obtained in response to a backend system request for one or more properties in a data structure of the computing device, such as in a registry of the computing device. The obtained property can comprise a plurality of properties of the computing device. The obtained property can be a network latency associated with the computing device, an OS used by the computing device, a connection modality of the computing device, a processing threshold of the computing device, a geographic location of the computing device, an amount of available storage associated with the computing device, an amount of available memory associated with the computing device, system health parameters, or network information associated with the computing device. In at least one embodiment, the application management system 102 performs the interrogation of the computing device to obtain the property. The computing device that provides a property can include one or more of the computing devices 114-120.

At block 408, the property is evaluated based on the parameter. Locating the parameter can be achieved by query using the property. For example, evaluation of the property based on the parameter can include comparing the property against the parameter to determine if the property is equal, equivalent, and/or satisfies the parameter. For example, when the property comprises a network latency time, such as a time in milliseconds or microseconds, the latency time is compared against a parameter specifying a latency time threshold. Alternatively, or in addition, when the property comprises a connection modality of the computing device, such as the type of computing device (i.e., corporate device or BYOD), the connection modality of the computing device is compared against a parameter specifying a type of computing device (i.e., corporate device or BYOD). In another example, when the property comprises an amount of computer storage available to the computing device, the amount is compared against a parameter specifying a minimum amount of storage required to install the requested software. As described herein, other properties and parameters can be considered. In at least one embodiment, the one or more described evaluations can be performed by a system, such as the application management system 102 and/or the application distribution module 122.

At block 410, a predefined computer-implemented host is selected to perform the software based on the evaluation performed at block 408. For example, when the property of the computing device requesting the software matches, corresponds to, or satisfies the parameter of a context established for the software, the computing device requesting the software can be selected to receive an executable file and associated data that enable installation of the software on the computer storage of the computing device. In another example, when the property of the computing device requesting the software does not match, correspond to, or satisfy the parameter of a context established for the software, a system hosting the executable file and associated data of the requested software can be selected to perform the software and provide data to the computing device requesting the software that allows it to display an interface of the software, such as in a web browser or other user interface.

Note that one or more of the operations performed in 402-410 may be performed in various orders and combinations, including in parallel.

Figure 5:
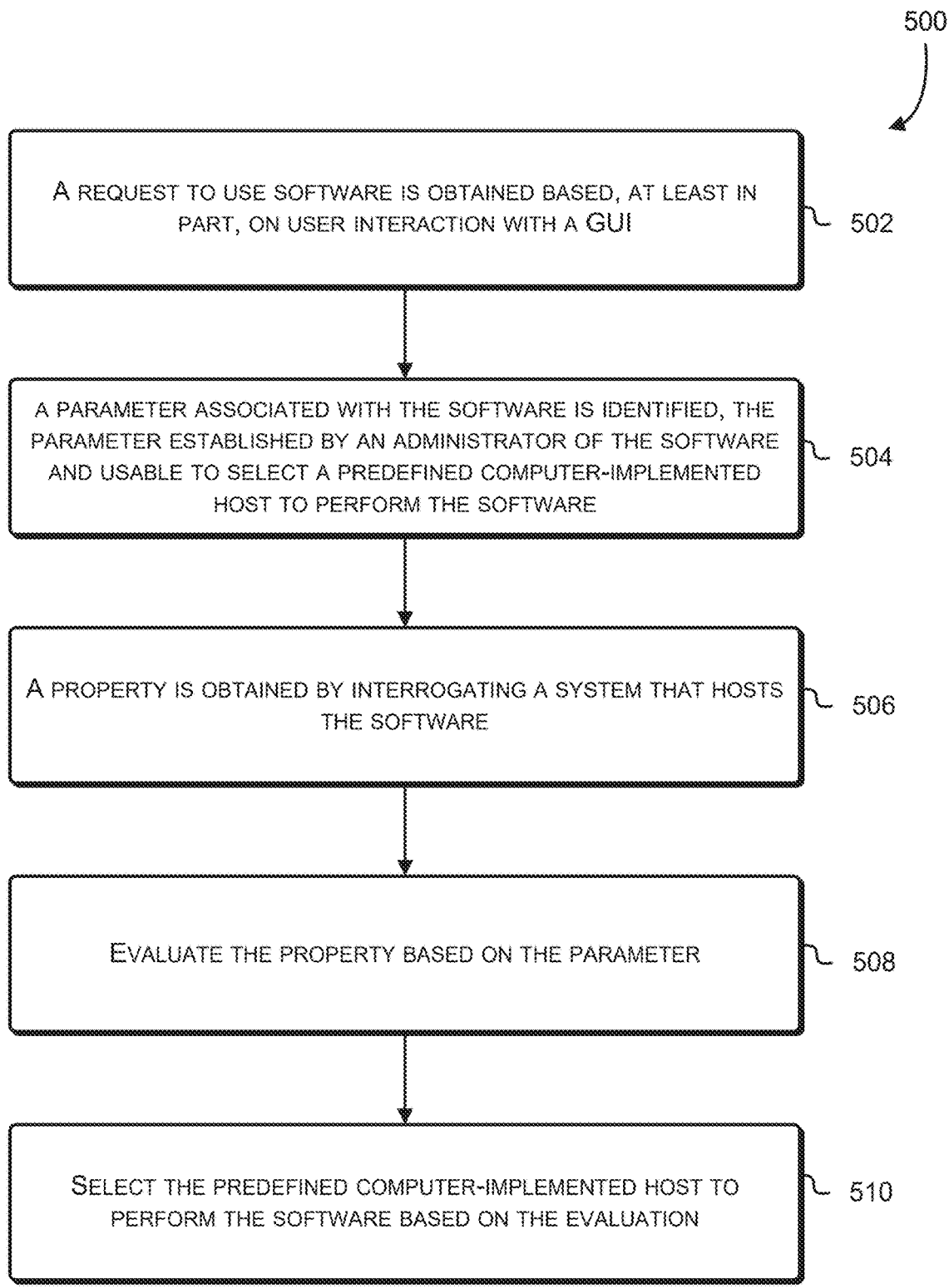
FIG. 5 is a flowchart illustrating an example of a process for performing context-aware application provisioning for computing devices, in accordance with various embodiments.

FIG. 5 is a flowchart illustrating an example of a process 500 for performing context-aware application provisioning for computing devices, in accordance with various embodiments. Some or all of the process 500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system, such as the computing devices and/or systems of FIGS. 1-3 and FIG. 6. The process 500 includes a series of operations, identified by respective blocks in the following, to perform context-aware application provisioning for computing devices, in accordance with various embodiments.

At block 502, a request to use software (e.g., an application) is obtained. In at least one embodiment, the request to use software is obtained based on user interaction with a GUI. For example, the request to use software is obtained based on user interaction with a graphical symbol, such as an icon for the software. The request may be received based on user interaction with a computing device to use the software. The request can be received at the backend systems of an entity, such as a corporation, which provides access to software. In at least one embodiment, the request is received by the application management system 102, and the request is generated by at least one of the computing devices 114-120. The request can include an identifier of the software that the requesting computing device is to display/use. In at least one embodiment, the request can include request 220 and/or 302.

At block 504, a parameter associated with the software is identified. The parameter can be established by an administrator of the software and is usable to select a predefined computer-implemented host to perform the software. In at least one embodiment, the parameter comprises a plurality of parameters. The parameter can be included in a data structure, such as a context data structure. Parameters, coupled with consideration of properties of a computing device, can determine how software is delivered to the computing device, which can be included in a plurality of predefined computer-implemented hosts considered by a system to provide access to the software. In an example, evaluation of the context based on properties of the computing device causes a system to deliver an executable installation file to the computing device (e.g., a computer-implemented host), which is then executed to install the software. In another example, evaluation of the context based on the properties of the computing device causes the system (e.g., a computer-implemented host) to deliver data that enables the computing device to display a web browser window, allowing the user to access the software. In at least one embodiment, the parameter is included in the context 108, 224, and/or 304. In at least one embodiment, the system comprises the application management system 102.

At block 506, a property of the computing device associated with the GUI is obtained. The property of the computing device associated with the GUI can be obtained by interrogating a system that hosts the requested software, such a backend system of a corporation or other entity. In at least one embodiment, the property of the computing device associated with the GUI is obtained in response to a backend system request for one or more properties in a data structure of the backend system, such as in data structure that includes one or more properties. The obtained property can comprise a plurality of properties of the computing device. The obtained property can be a network latency associated with the computing device, an OS used by the computing device, a connection modality of the computing device, a processing threshold of the computing device, a geographic location of the computing device, an amount of available storage associated with the computing device, an amount of available memory associated with the computing device, or network information associated with the computing device. In at least one embodiment, the application management system 102 performs the interrogation of one or more computer storages of the system 102 to obtain the property. In at least one embodiment, the property is stored in the computer storage system 106. In at least one embodiment, the property is included in the properties data structure 110.

At block 508, the property is evaluated based on the parameter. For example, evaluation of the property based on the parameter can include comparing the property against the parameter to determine if the property is equal, equivalent, and/or satisfies the parameter. For example, when the property comprises a network latency time, such as a time in milliseconds or microseconds, the latency time is compared against a parameter specifying a latency time threshold. Alternatively, or in addition, when the property comprises a connection modality of the computing device, such as the type of computing device (i.e., corporate device or BYOD), the connection modality of the computing device is compared against a parameter specifying a type of computing device (i.e., corporate device or BYOD). In another example, when the property comprises an amount of computer storage available to the computing device, the amount is compared against a parameter specifying a minimum amount of storage required to install the requested software. As described herein, other properties and parameters can be considered. In at least one embodiment, the one or more described evaluations can be performed by a system, such as the application management system 102 and/or the application distribution module 122. Locating the parameter can be achieved by query using the property.

At block 510, a predefined computer-implemented host is selected to perform the software based on the evaluation performed at block 508. For example, when the property of the computing device requesting the software matches, corresponds to, or satisfies the parameter of a context established for the software, the computing device requesting the software can be selected to receive an executable file and associated data that enable installation of the software on the computer storage of the computing device. In another example, when the property of the computing device requesting the software does not match, correspond to, or satisfy the parameter of a context established for the software, a system hosting the executable file and associated data of the requested software can be selected to perform the software and provide data to the computing device requesting the software that allows it to display an interface of the software, such as in a web browser or other user interface.

Note that one or more of the operations performed in 502-510 may be performed in various orders and combinations, including in parallel.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denotes that the instructions are being executed by a machine, thereby causing the machine to perform the specified operations.

Figure 6:
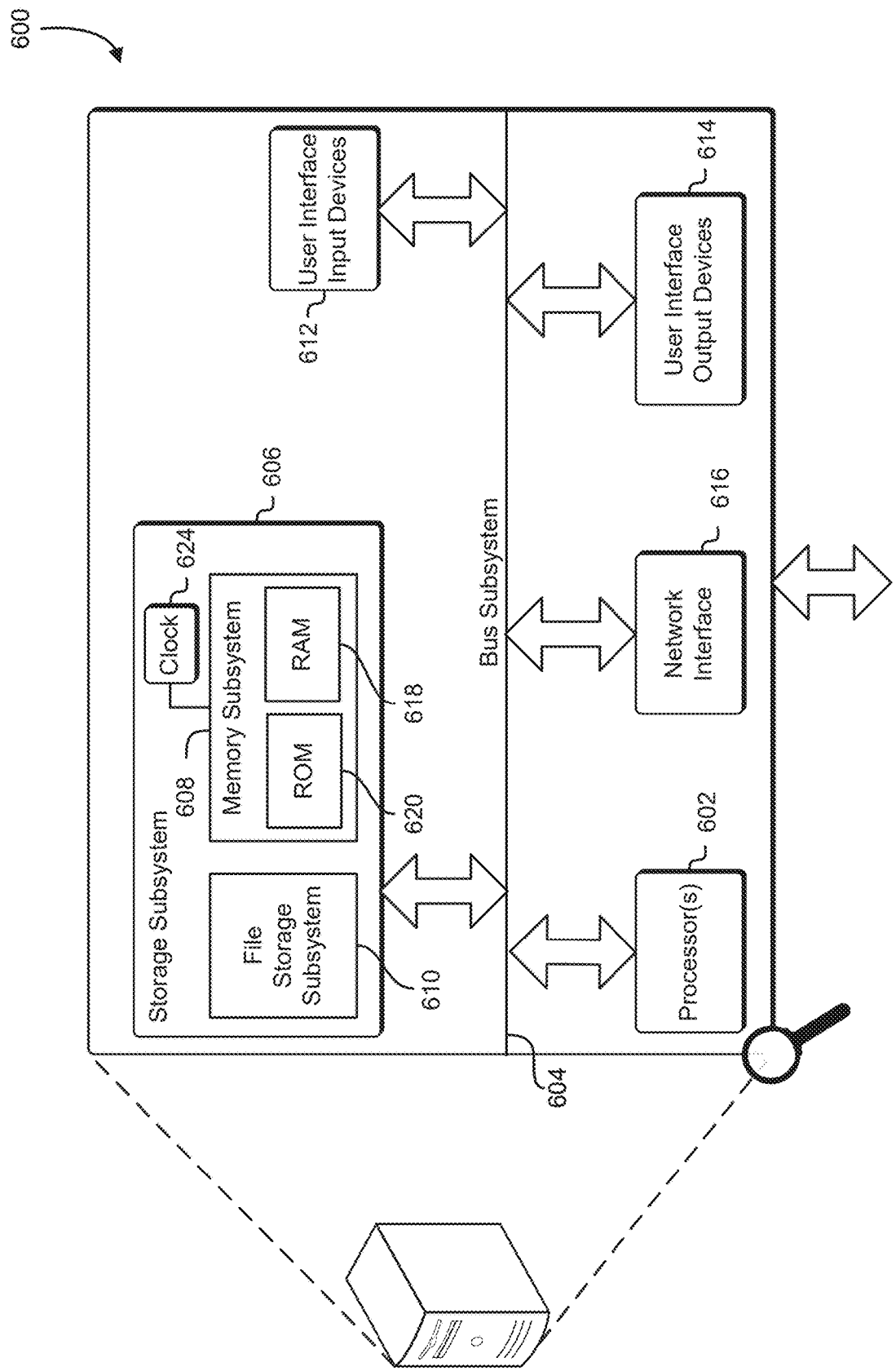
FIG. 6 illustrates a computing device that may be used in accordance with at least one embodiment, one or more of the described computing devices or systems, and/or in an environment in which various embodiments can be implemented.

FIG. 6 illustrates a computing device that may be used in accordance with at least one embodiment, one or more of the described computing devices or systems, and/or in an environment in which various embodiments can be implemented. FIG. 6 depicts an illustrative, simplified block diagram of a computing device 600 that can be used to practice at least one embodiment of the present disclosure. In various embodiments, the computing device 600 includes any appropriate device operable to send and/or receive requests, messages, or information over an appropriate network and convey information back to a user of the device. The computing device 600 may be used to implement any of the systems illustrated and described above. For example, the computing device 600 may be configured for use as a data server, a web server, a portable computing device, a personal computer, a cellular or other mobile phone, a handheld messaging device, a laptop computer, a tablet computer, a set-top box, a personal data assistant, an embedded computer system, an electronic book reader, or any electronic computing device. The computing device 600 may be implemented as a hardware device, a virtual computer system, or one or more programming modules executed on a computer system, and/or as another device configured with hardware and/or software to receive and respond to communications (e.g., web service application programming interface (API) requests) over a network.

As shown in FIG. 6, the computing device 600 may include one or more processors 602 that, in embodiments, communicate with and are operatively coupled to a number of peripheral subsystems via a bus subsystem. In some embodiments, these peripheral subsystems include a storage subsystem 606, comprising a memory subsystem 608 and a file/disk storage subsystem 610, one or more user interface input devices 612, one or more user interface output devices 614, and a network interface subsystem 616. Such storage subsystem 606 may be used for temporary or long-term storage of information. In at least some embodiments, the one or more processors 602 can include graphics processing units (GPUs), such as those provided by NVIDIA and AMD, Graphcore IPUs, IBM Power AI processors, and Qualcomm Snapdragon processors with AI engines.

In some embodiments, the bus subsystem 604 may provide a mechanism for enabling the various components and subsystems of computing device 600 to communicate with each other as intended. Although the bus subsystem 604 is shown schematically as a single bus, alternative embodiments of the bus subsystem utilize multiple buses. The network interface subsystem 616 may provide an interface to other computing devices and networks. The network interface subsystem 616 may serve as an interface for receiving data from and transmitting data to other systems from the computing device 600. In some embodiments, the bus subsystem 604 is utilized for communicating data such as details, search terms, and so on. In an embodiment, the network interface subsystem 616 may communicate via any appropriate network that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), Common Internet File System (CIFS), and other protocols.

The network, in an embodiment, is a local area network, a wide-area network, a virtual private network, the Internet, an intranet, an extranet, a public switched telephone network, a cellular network, an infrared network, a wireless network, a satellite network, or any other such network and/or combination thereof, and components used for such a system may depend at least in part upon the type of network and/or system selected. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering. Many protocols and components for communicating via such a network are well known and will not be discussed in detail. In an embodiment, communication via the network interface subsystem 616 is enabled by wired and/or wireless connections and combinations thereof.

In some embodiments, the user interface input devices 612 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 600. In some embodiments, the one or more user interface output devices 614 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 600. The one or more user interface output devices 614 can be used, for example, to present user interfaces to facilitate user interaction with applications performing processes described and variations therein, when such interaction may be appropriate.

In some embodiments, the storage subsystem 606 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 606. These application modules or instructions can be executed by the one or more processors 602. In various embodiments, the storage subsystem 606 additionally provides a repository for storing data used in accordance with the present disclosure. In some embodiments, the storage subsystem 606 comprises a memory subsystem 608 and a file/disk storage subsystem 610.

In embodiments, the memory subsystem 608 includes a number of memories, such as a main random-access memory (RAM) 618 for storage of instructions and data during program execution and/or a read only memory (ROM) 620, in which fixed instructions can be stored. In some embodiments, the file/disk storage subsystem 610 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 600 includes at least one local clock 624. The at least one local clock 624, in some embodiments, is a counter that represents the number of ticks that have transpired from a particular starting date and, in some embodiments, is located integrally within the computing device 600. In various embodiments, the at least one local clock 624 is used to synchronize data transfers in the processors for the computing device 600 and the subsystems included therein at specific clock pulses and can be used to coordinate synchronous operations between the computing device 600 and other systems in a data center. In another embodiment, the local clock is a programmable interval timer.

The computing device 600 could be of any of a variety of types, including a portable computer device, tablet computer, a workstation, or any other device described below. Additionally, the computing device 600 can include another device that, in some embodiments, can be connected to the computing device 600 through one or more ports (e.g., USB, a headphone jack, Lightning connector, etc.). In embodiments, such a device includes a port that accepts a fiber-optic connector. Accordingly, in some embodiments, this device converts optical signals to electrical signals that are transmitted through the port connecting the device to the computing device 600 for processing. Due to the ever-changing nature of computers and networks, the description of the computing device 600 depicted in FIG. 6 is intended only as a specific example for purposes of illustrating the preferred embodiment of the device. Many other configurations having more or fewer components than the system depicted in FIG. 6 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

In some embodiments, data may be stored in a data store (not depicted). In some examples, a "data store" refers to any device or combination of devices capable of storing, accessing, and retrieving data, which may include any combination and number of data servers, databases, data storage devices, and data storage media, in any standard, distributed, virtual, or clustered system. A data store, in an embodiment, communicates with block-level and/or object level interfaces. The computing device 600 may include any appropriate hardware, software, and firmware for integrating with a data store as needed to execute aspects of one or more applications for the computing device 600 to handle some or all of the data access and business logic for the one or more applications. The data store, in an embodiment, includes several separate data tables, databases, data documents, dynamic data storage schemes, and/or other data storage mechanisms and media for storing data relating to a particular aspect of the present disclosure. In an embodiment, the computing device 600 includes a variety of data stores and other memory and storage media as discussed above. These can reside in a variety of locations, such as on a storage medium local to (and/or resident in) one or more of the computers or remote from any or all of the computers across a network. In an embodiment, the information resides in a storage-area network (SAN) familiar to those skilled in the art, and, similarly, any necessary files for performing the functions attributed to the computers, servers or other network devices are stored locally and/or remotely, as appropriate.

In an embodiment, the computing device 600 may provide access to content including, but not limited to, text, graphics, audio, video, and/or other content that is provided to a user in the form of HyperText Markup Language (HTML), Extensible Markup Language (XML), JavaScript, Cascading Style Sheets (CSS), JavaScript Object Notation (JSON), and/or another appropriate language. The computing device 600 may provide the content in one or more forms including, but not limited to, forms that are perceptible to the user audibly, visually, and/or through other senses. The handling of requests and responses, as well as the delivery of content, in an embodiment, is handled by the computing device 600 using PHP: Hypertext Preprocessor (PHP), Python, Ruby, Perl, Java, HTML, XML, JSON, and/or another appropriate language in this example. In an embodiment, operations described as being performed by a single device are performed collectively by multiple devices that form a distributed and/or virtual system.

In an embodiment, the computing device 600 typically will include an operating system that provides executable program instructions for the general administration and operation of the computing device 600 and includes a computer-readable storage medium (e.g., a hard disk, random access memory (RAM), read only memory (ROM), etc.) storing instructions that if executed (e.g., as a result of being executed) by a processor of the computing device 600 cause or otherwise allow the computing device 600 to perform its intended functions (e.g., the functions are performed as a result of one or more processors of the computing device 600 executing instructions stored on a computer-readable storage medium).

In an embodiment, the computing device 600 operates as a web server that runs one or more of a variety of server or mid-tier applications, including Hypertext Transfer Protocol (HTTP) servers, FTP servers, Common Gateway Interface (CGI) servers, data servers, Java servers, Apache servers, and business application servers. In an embodiment, computing device 600 is also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python, or TCL, as well as combinations thereof. In an embodiment, the computing device 600 is capable of storing, retrieving, and accessing structured or unstructured data. In an embodiment, computing device 600 additionally or alternatively implements a database, such as one of those commercially available from Oracle®, Microsoft®, Sybase®, and IBM® as well as open-source servers such as MySQL, Postgres, SQLite, MongoDB. In an embodiment, the database includes table-based servers, document-based servers, unstructured servers, relational servers, non-relational servers, or combinations of these and/or other database servers.

At least one embodiment of the disclosure can be described in view of the following clauses:

Clause 1. A computer-implemented method, comprising: obtaining a request to use software based, at least in part, on user interaction with a graphical user interface (GUI); identifying a parameter associated with the software, the parameter established by an administrator of the software and usable to select a predefined computer-implemented host to perform the software; obtaining a property of a computing device associated with the GUI; evaluating the property based, at least in part, on the parameter; and selecting the predefined computer-implemented host to perform the software based, at least in part, on the evaluation.

Clause 2. The computer-implemented method of clause 1, wherein the parameter is comprised in a data structure hosted on one or more computer-implemented servers associated with the administrator, the data structure comprising a plurality of parameters including the parameter associated with the software, the plurality of parameters selected from a group consisting of a network latency threshold, an operating system (OS) information, a connection modality type, a processing threshold, geographical location information, health information, and application availability information.

Clause 3. The computer-implemented method of any one or more of the preceding clauses, wherein obtaining the property of the computing device comprises referencing a data structure hosted by computer storage of the computing device, the data structure comprising a plurality of properties including the property of the computing device, the plurality of properties selected from a group consisting of a network latency associated with the computing device, an operating system (OS) information used by the computing device, health information, a connection modality of the computing device, and a processing property of the computing device.

Clause 4. The computer-implemented method of any one or more of the preceding clauses, wherein obtaining the request to use the software comprises receiving the request over a network connection used by the computing device associated with the GUI, the request triggered by user selection of a graphic element in the GUI to launch the software, and the request to cause one or more computer-implemented servers associated with the administrator to obtain the property of the computing device from a first data structure and query a second data structure to locate the parameter related to the property.

Clause 5. The computer-implemented method of any one or more of the preceding clauses, wherein selecting the predefined computer-implemented host to perform the software, based, at least in part, on the evaluation comprises selecting the computing device associated with the GUI as the predefined computer-implemented host to perform the software and causing installation of the software in computer storage of the computing device, causing the installation of the software comprising determining a user is authorized to use the software.

Clause 6. The computer-implemented method of any one or more of the preceding clauses, wherein selecting the predefined computer-implemented host to perform the software, based, at least in part, on the evaluation comprises causing the GUI to display an Internet web browser window to provide access to a GUI of the software, the GUI of the software provided by, at least in part, performing the software on one or more computer-implemented servers associated with the administrator.

Clause 7. The computer-implemented method of any one or more of the preceding clauses, wherein the property of the computing device associated with the GUI comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

Clause 8. A system, comprising: one or more processors; and memory including computer-executable instructions that, if executed by the one or more processors, cause the system to: obtain a request to use software based, at least in part, on user interaction with a graphical symbol on a display of a computing device; identify a parameter associated with the software, the parameter established by an administrator of the software and usable to select a predefined computer-implemented host to perform the software; obtain a property of the computing device displaying the graphical symbol; evaluate the property based, at least in part, on the parameter; and select the predefined computer-implemented host to perform the software based, at least in part, on the evaluation.

Clause 9. The system of any one or more of the preceding clauses, wherein the graphical symbol is a computer icon displayed on a graphical user interface (GUI) displayable using a plurality of different computing devices, and the request includes metadata comprising an identifier of the software, and selecting the predefined computer-implemented host to perform the software includes causing one or more computer-implemented servers associated with the administrator to permit at least display of a user interface (UI) of the software on a display of one of the plurality of different computing devices, the plurality of different computing devices including the computing device.

Clause 10. The system of any one or more of the preceding clauses, wherein selecting the predefined computer-implemented host to perform the software includes causing one or more computer-implemented servers associated with the administrator to permit at least display of a user interface (UI) of the software on a display of one of a plurality of different computing devices, the plurality of different computing devices including the computing device.

Clause 11. The system of any one or more of the preceding clauses, wherein selecting the predefined computer-implemented host to perform the software includes communicating, by one or more computer-implemented servers associated with the administrator, an executable computer file to the computing device, the executable computer file, when executed, to install the software on computer storage of the computing device, and selecting the predefined computer-implemented host to perform the software further comprises evaluating health information of the predefined computer-implemented host to perform the software.

Clause 12. The system of any one or more of the preceding clauses, wherein the parameter is comprised in a data structure hosted on one or more computer-implemented servers associated with the administrator, the data structure comprising a plurality of parameters including the parameter associated with the software, the plurality of parameters selected from a group consisting of a computer storage threshold, a memory threshold, network information, and regulatory information.

Clause 13. The system of any one or more of the preceding clauses, wherein obtaining the request to use the software comprises receiving the request over a network connection used by the computing device, the request triggered by user selection of the graphical symbol, and the request to cause one or more computer-implemented servers associated with the administrator to obtain the property of the computing device from a first data structure and query a second data structure to locate the parameter related to the property.

Clause 14. The system of any one or more of the preceding clauses, wherein the property of the computing device comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

Clause 15. A non-transitory computer-readable storage medium having stored thereon executable instructions that, if executed by one or more processors of a computer system, cause the computer system to at least: obtain a request to use software based, at least in part, on user interaction with a graphical user interface (GUI); identify a parameter associated with the software, the parameter established by an administrator of the software and usable to select a predefined computer-implemented host to perform the software; obtain a property of a computing device associated with the GUI; evaluate the property based, at least in part, on the parameter; and select the predefined computer-implemented host to perform the software based, at least in part, on the evaluation.

Clause 16. The non-transitory computer-readable storage medium of any one or more of the preceding clauses, wherein selecting the predefined computer-implemented host to perform the software includes causing one or more computer-implemented servers associated with the administrator to permit at least display of a user interface (UI) of the software on a display of one of a plurality of different computing devices, the plurality of different computing devices including the computing device.

Clause 17. The non-transitory computer-readable storage medium of any one or more of the preceding clauses, wherein selecting the predefined computer-implemented host to perform the software includes communicating, by one or more computer-implemented servers associated with the administrator, an executable computer file to the computing device, the executable computer file, when executed, to install the software on computer storage of the computing device, and communicating one or more instructions, by one or more computer-implemented servers associated with the administrator, to cause one or more modifications to a configuration of the computing device.

Clause 18. The non-transitory computer-readable storage medium of any one or more of the preceding clauses, wherein obtaining the request to use the software comprises receiving the request over a network connection used by the computing device, the request triggered by user selection of a graphical symbol associated with the GUI, and the request to cause one or more computer-implemented servers associated with the administrator to obtain the property of the computing device from a first data structure and query a second data structure to locate the parameter related to the property.

Clause 19. The non-transitory computer-readable storage medium of any one or more of the preceding clauses, wherein the property of the computing device comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

Clause 20. The non-transitory computer-readable storage medium of any one or more of the preceding clauses, wherein obtaining the property of the computing device comprises referencing a data structure hosted by computer storage of the computing device or one or more computer-implemented servers associated with the administrator, the data structure comprising a plurality of properties including the property of the computing device, the plurality of properties selected from a group consisting of a geographic location of the computing device, an amount of available computer storage associated with the computing device, an amount of available memory associated with the computing device, and network connection information associated with the computing device.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    causing a computing device associated with a graphical user interface (GUI) to determine a plurality of properties corresponding to one or more operational characteristics associated with the computing device;

obtaining a request to use software based, at least in part, on user interaction with the GUI, the request comprising a property of the plurality of properties corresponding to the one or more operational characteristics associated with the computer device, and the request triggered based on user selection of a graphic element in the GUI to launch the software;

performing a query based on the property to identify a parameter associated with the software, the parameter established by an administrator of the software and at least in part usable to select at least one of a plurality of computer-implemented hosts to perform the software;

evaluating the property based, at least in part, on the parameter;

selecting a predefined computer-implemented host of the plurality of computer-implemented hosts to perform the software based, at least in part, on the evaluation; and causing the selected predefined computer-implemented host to execute the software.

2. The computer-implemented method of claim 1, wherein the parameter is comprised in a data structure hosted on one or more computer-implemented servers associated with the administrator, the data structure comprising a plurality of parameters including the parameter associated with the software, the plurality of parameters selected from a group consisting of a network latency threshold, an operating system (OS) information, a connection modality type, a processing threshold, geographical location information, health information, and application availability information.

3. The computer-implemented method of claim 1, wherein the property is included in a data structure hosted by computer storage of the computing device, the data structure comprising the plurality of properties, the plurality of properties selected from a group consisting of a network latency associated with the computing device, an operating system (OS) information used by the computing device, health information, a connection modality of the computing device, and a processing property of the computing device.

4. The computer-implemented method of claim 1, wherein obtaining the request to use the software comprises receiving the request over a network connection used by the computing device associated with the GUI, the request to cause one or more computer-implemented servers associated with the administrator to query a data structure to locate the parameter related to the property.

5. The computer-implemented method of claim 1, wherein selecting the predefined computer-implemented host to perform the software, based, at least in part, on the evaluation comprises selecting the computing device associated with the GUI as the predefined computer-implemented host to perform the software and causing installation of the software in computer storage of the computing device, causing the installation of the software comprising determining a user is authorized to use the software.

6. The computer-implemented method of claim 1, wherein selecting the predefined computer-implemented host to perform the software, based, at least in part, on the evaluation comprises causing the GUI to display an Internet web browser window to provide access to a GUI of the software, the GUI of the software provided by, at least in part, performing the software on one or more computer-implemented servers associated with the administrator.

7. The computer-implemented method of claim 1, wherein the property comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

8. A system, comprising:
one or more processors; and
memory including computer-executable instructions that, if executed by the one or more processors, cause the system to:
cause a computing device to determine a plurality of properties corresponding to one or more operational characteristics associated with the computing device;
obtain a request to use software based, at least in part, on user interaction with a graphical symbol on a display of the computing device, the request comprising a property of the plurality of properties corresponding to the one or more operational characteristics associated with the computer device;
perform a query based on the property to identify a parameter associated with the software, the parameter established by an administrator of the software and at least in part usable to select at least one of a plurality of computer-implemented hosts to perform the software;
evaluate the property based, at least in part, on the parameter;
select a predefined computer-implemented host of the plurality of computer-implemented hosts to perform the software based, at least in part, on the evaluation; and
cause the selected predefined computer-implemented host to execute the software.

9. The system of claim 8, wherein the graphical symbol is a computer icon displayed on a graphical user interface (GUI) displayable using a plurality of different computing devices, and the request includes metadata comprising an identifier of the software, and selecting the predefined computer-implemented host to perform the software includes causing one or more computer-implemented servers associated with the administrator to permit at least display of a user interface (UI) of the software on a display of one of the plurality of different computing devices, the plurality of different computing devices including the computing device.

10. The system of claim 8, wherein selecting the predefined computer-implemented host to perform the software includes causing one or more computer-implemented servers associated with the administrator to permit at least display of a user interface (UI) of the software on a display of one of a plurality of different computing devices, the plurality of different computing devices including the computing device.

11. The system of claim 8, wherein selecting the predefined computer-implemented host to perform the software includes communicating, by one or more computer-implemented servers associated with the administrator, an executable computer file to the computing device, the executable computer file, when executed, to install the software on computer storage of the computing device, and selecting the predefined computer-implemented host to perform the software further comprises evaluating health information of the predefined computer-implemented host to perform the software.

12. The system of claim 8, wherein the parameter is comprised in a data structure hosted on one or more computer-implemented servers associated with the administrator, the data structure comprising a plurality of parameters including the parameter associated with the software, the plurality of parameters selected from a group consisting of a computer storage threshold, a memory threshold, network information, and regulatory information.

13. The system of claim 8, wherein obtaining the request to use the software comprises receiving the request over a network connection used by the computing device, the request triggered by user selection of the graphical symbol, and the request to cause one or more computer-implemented servers associated with the administrator to query a data structure to locate the parameter related to the property.

14. The system of claim 8, wherein the property comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

15. A non-transitory computer-readable storage medium having stored thereon executable instructions that, if executed by one or more processors of a computer system, cause the computer system to at least:
- cause a computing device associated with a graphical user interface (GUI) to determine a plurality of properties corresponding to one or more operational characteristics associated with the computing device;
- obtain a request to use software based, at least in part, on user interaction with the GUI, the request comprising a property of the plurality of properties corresponding to the one or more operational characteristics associated with the computer device, and the request triggered based on user selection of a graphic element in the GUI to launch the software;
- perform a query based on the property to identify a parameter associated with the software, the parameter established by an administrator of the software and at least in part usable to select at least one of a plurality of computer-implemented hosts to perform the software;
- evaluate the property based, at least in part, on the parameter;
- select a predefined computer-implemented host of the plurality of computer-implemented hosts to perform the software based, at least in part, on the evaluation; and
- cause the predefined computer-implemented host to execute the software.

16. The non-transitory computer-readable storage medium of claim 15, wherein selecting the predefined computer-implemented host to perform the software includes causing one or more computer-implemented servers associated with the administrator to permit at least display of a user interface (UI) of the software on a display of one of a plurality of different computing devices, the plurality of different computing devices including the computing device.

17. The non-transitory computer-readable storage medium of claim 15, wherein selecting the predefined computer-implemented host to perform the software includes communicating, by one or more computer-implemented servers associated with the administrator, an executable computer file to the computing device, the executable computer file, when executed, to install the software on computer storage of the computing device, and communicating one or more instructions, by one or more computer-implemented servers associated with the administrator, to cause one or more modifications to a configuration of the computing device.

18. The non-transitory computer-readable storage medium of claim 15, wherein obtaining the request to use the software comprises receiving the request over a network connection used by the computing device, the request to cause one or more computer-implemented servers associated with the administrator to query a data structure to locate the parameter related to the property.

19. The non-transitory computer-readable storage medium of claim 15, wherein the property comprises data collected from information about the computing device, the information about the computing device hosted on computer storage of the computing device or one or more computer-implemented servers associated with the administrator, and evaluating the property based, at least in part, on the parameter comprises determining whether the data conforms to information of the parameter or satisfies a threshold of the parameter.

20. The non-transitory computer-readable storage medium of claim 15, wherein the property is included in a data structure hosted by computer storage of the computing device or one or more computer-implemented servers associated with the administrator, the data structure comprising the plurality of properties, the plurality of properties selected from a group consisting of a geographic location of the computing device, an amount of available computer storage associated with the computing device, an amount of available memory associated with the computing device, and network connection information associated with the computing device.

* * * * *